United States Patent
Chang et al.

(10) Patent No.: US 10,057,596 B2
(45) Date of Patent: Aug. 21, 2018

(54) MOTION ESTIMATION METHOD AND APPARATUS FOR PERIODIC PATTERN

(71) Applicant: NOVATEK Microelectronics Corp., Hsin-Chu (TW)

(72) Inventors: Hsiao-En Chang, Hsinchu (TW); Cheng-Wei Chou, New Taipei (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 108 days.

(21) Appl. No.: 15/345,470

(22) Filed: Nov. 7, 2016

(65) Prior Publication Data
US 2018/0131959 A1 May 10, 2018

(51) Int. Cl.
*H04N 19/00* (2014.01)
*H04N 19/527* (2014.01)
*H04N 19/513* (2014.01)
*H04N 19/543* (2014.01)

(52) U.S. Cl.
CPC ......... *H04N 19/527* (2014.11); *H04N 19/521* (2014.11); *H04N 19/543* (2014.11)

(58) Field of Classification Search
CPC ... H04N 19/527; H04N 19/521; H04N 19/543
USPC ................................................... 375/240.16
See application file for complete search history.

(56) References Cited

U.S. PATENT DOCUMENTS

| 8,467,453 | B2 | 6/2013 | Wu |
| 2008/0204592 | A1 | 8/2008 | Jia |
| 2010/0329343 | A1* | 12/2010 | Wu ........................ H04N 5/145 375/240.16 |
| 2012/0075535 | A1 | 3/2012 | Van Beek |

* cited by examiner

*Primary Examiner* — Jeffery Williams
(74) *Attorney, Agent, or Firm* — Winston Hsu

(57) ABSTRACT

A motion estimation method for blocks of a periodic pattern is provided, which includes determining a global motion vector corresponding to a region according to motion vectors of periodic blocks in the region; generating candidate motion vectors of a target periodic block to be encoded in a second frame; for each candidate motion vector, determining a penalty value based on at least one difference between the candidate motion vector and at least one global motion vector corresponding to at least a relative region in the first frame; for each candidate motion vector, calculating a weighted similarity value based on an original similarity value between the target periodic block of the second frame and a reference block corresponding to the candidate motion vector of the first frame, and the penalty value; and determining a motion vector of the target periodic block according to weighted similarity values of the candidate motion vectors.

18 Claims, 6 Drawing Sheets

MOTION ESTIMATION METHOD AND APPARATUS FOR PERIODIC PATTERN

BACKGROUND OF THE INVENTION

1. Field of the Invention

The present invention relates to a motion estimation method and apparatus for blocks of a periodic pattern, and more particularly, to a motion estimation method and apparatus for determining motion vectors of blocks of the periodic pattern.

2. Description of the Prior Art

Motion estimation is an important technique used in video compression, its objective being to reduce redundant information from video frames at various time points. Generally, a video achieves an illusion of motion through playback of a series of still images differentiated by subtle variations between two consecutive frames, as a result of persistence of human vision. Moreover, two adjacent frames are usually almost identical, distinguished by only slight or even no variation. In such a case, during video encoding it is unnecessary to store unchanging parts of a frame, and only necessary to record modifications relative to reference frames. Thus, during video decoding, a current frame may be reconstructed from a reference frame using information recorded during motion. As such, it is unnecessary to store all frames, thus effectively reducing an amount of transmitted information, and thereby achieving video compression. Motion estimation techniques aim to generate certain information during image motion, e.g. a motion vector.

Block matching is one of the most common motion estimation methods, which divides an image frame into multiple non-overlapping blocks to identify the most similar parts between the blocks at different times, and to obtain a motion vector between the blocks. For example, a sum of absolute difference (SAD) computation method is often used for determining a motion vector from corresponding candidate vectors. However, there is a high degree of similarity among blocks in a periodic pattern. That is, some blocks in the periodic pattern may have high similarity with their surrounding pixels. As such, when a block in the periodic pattern changes its position, it may not appear to have movement since the high degree of similarity among blocks in the periodic pattern. Moreover, candidate motion vectors for estimating a motion vector of a block may have relatively small SAD values, thus leading to selection of incorrect motion vector. Please refer to FIG. 1 and FIG. 2, which are diagrams illustrating a periodic pattern in different frames according to the prior art. The frame N+¼ represents an interpolated frame. As shown in FIG. 1, motion vectors of blocks of the periodic pattern determined by motion estimation are correct, and a correct interpolated frame is generated. In such a situation, the motion of the period pattern is fluid. However, FIG. 2 illustrates a different situation. For a block of the periodic pattern, if a candidate motion vector associated with the smallest SAD value is zero (i.e., zero motion vector), the determined motion vector of the block of the periodic pattern would be erroneously a zero motion vector, and an incorrect interpolated frame is generated as shown in FIG. 2. In such a situation, image broken will occur and the periodic pattern in motion may be blurred or edge serrated, which results in poor image quality. Thus, there is a need for improvement of the prior art.

SUMMARY OF THE INVENTION

It is therefore an objective of the claimed invention to provide a motion estimation method for blocks of a periodic pattern and an apparatus thereof capable of accurately determining motion vectors of blocks of the periodic pattern.

The present invention discloses a motion estimation method for blocks of a periodic pattern, comprising: determining a global motion vector corresponding to a region in a first frame according to motion vectors of periodic blocks in the region in the first frame, wherein the region is one of a plurality of regions divided from the first frame and the periodic blocks in the region are a part of the periodic pattern; generating a plurality of candidate motion vectors of a target periodic block to be encoded in a second frame; for each candidate motion vector, determining a penalty value based on at least one difference between the candidate motion vector and at least one global motion vector corresponding to at least a relative region in the first frame, wherein the at least one relative region is associated with the target periodic block; for each candidate motion vector, calculating a weighted similarity value based on an original similarity value difference between the target periodic block of the second frame and a reference block corresponding to the candidate motion vector of the first frame, and the penalty value; and determining a motion vector of the target periodic block according to weighted similarity values of the candidate motion vectors.

The present invention further discloses a motion estimation apparatus for blocks of a periodic pattern, comprising: a global motion vector calculation unit, for determining a global motion vector corresponding to a region in a first frame according to motion vectors of periodic blocks in the region in the first frame, wherein the region is one of a plurality of regions divided from the first frame and the periodic blocks in the region are a part of the periodic pattern; a candidate motion vector generation unit, for generating a plurality of candidate motion vectors of a target periodic block to be encoded in a second frame; a penalty calculation unit, for determining a penalty value for each candidate motion vector based on at least one difference between the candidate motion vector and at least one global motion vector corresponding to at least one relative region in the first frame, wherein the at least one relative region is associated with the target periodic block; a weighted similarity calculation unit, for calculating a weighted similarity value for each candidate motion vector based on an original similarity value between the target periodic block of the second frame and a reference block corresponding to the candidate motion vector of the first frame, and the penalty value; and a motion vector determination unit, for determining a motion vector of the target periodic block according to weighted similarity values of the candidate motion vectors.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
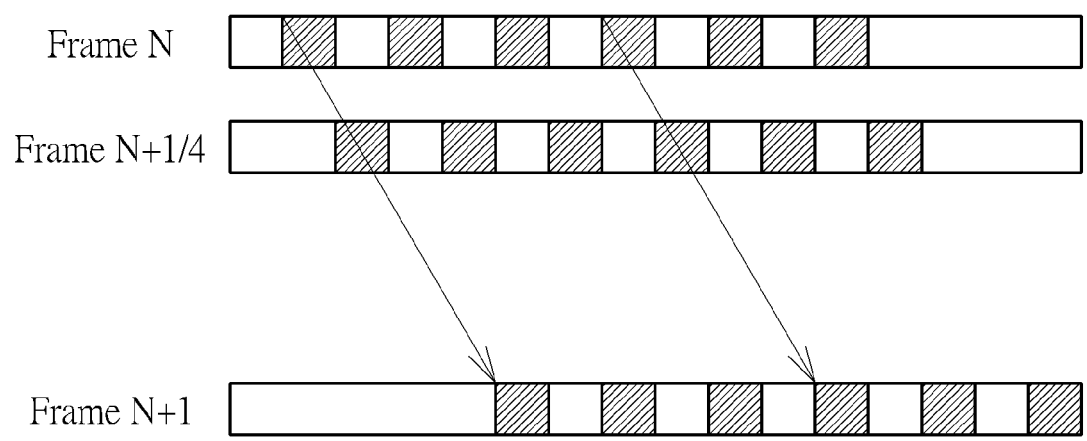
FIG. 1 and FIG. 2 are diagrams illustrating a periodic pattern in different frames according to the prior art.
Figure 2:
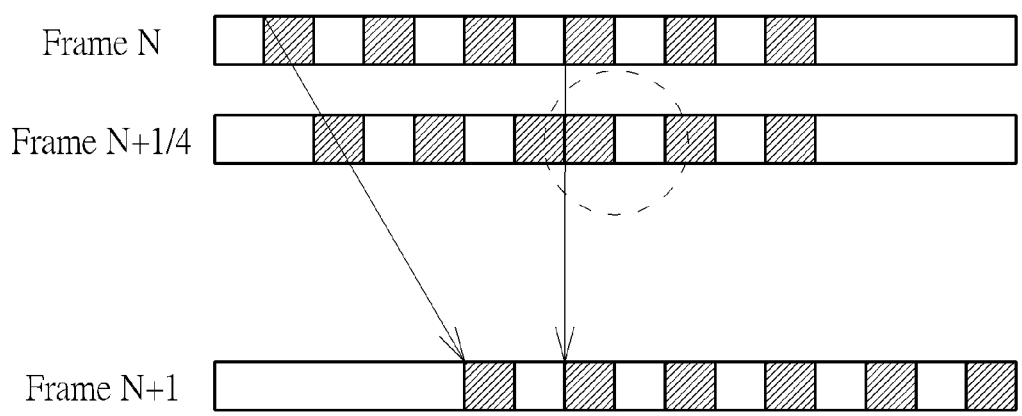
Figure 3:
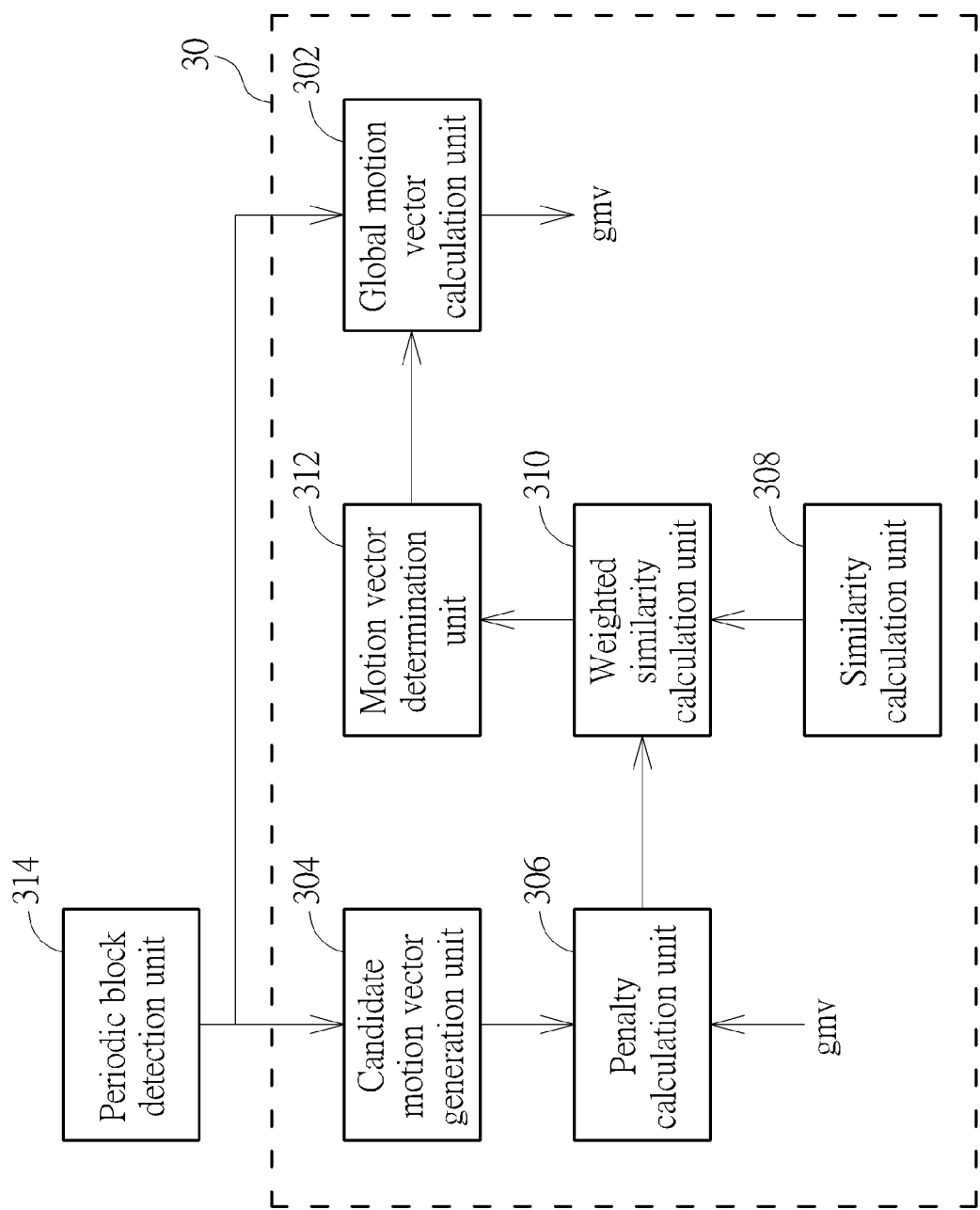
FIG. 3 is a schematic diagram of a motion estimation apparatus according to an exemplary embodiment of the present invention.

Please refer to FIG. 3, which is a schematic diagram of a motion estimation apparatus 30 according to an exemplary embodiment of the present invention. In an embodiment, the motion estimation apparatus 30 may be implemented as a module including a plurality of program codes stored in a memory, and these program codes may be executed by a processor or other similar devices. In another embodiment, the motion estimation apparatus 30 may be implemented as one or more circuits in a central processing unit (CPU), a video codec, or other similar devices, or a combination of the said devices, which are not particularly limited by the invention. The invention is not intended to limit whether the motion estimation apparatus 30 is implemented by ways of software or hardware.

As shown in FIG. 3, the motion estimation apparatus 30 is coupled to a periodic block detection unit 314. The periodic block detection unit 314 is utilized for determining whether a block (in a frame) is a part of a periodic pattern, and if the block is a part of the periodic pattern, called a periodic block hereinafter, the periodic block detection unit 314 outputs information associated with the periodic block to the motion estimation apparatus 30. The motion estimation apparatus 30 includes a global motion vector calculation unit 302, a candidate motion vector generation unit 304, a penalty calculation unit 306, a similarity calculation unit 308, a weighted similarity calculation unit 310, and a motion vector determination unit 312. In the embodiments of the detailed descriptions, a frame may include a plurality of blocks and the area of a frame may be regarded as being divided into a plurality of regions, each region being divided into sub-regions, such as four sub-regions. Thus, there are blocks in each region or sub-region. Each block may include one or more pixels. A periodic block may be a part of a respective periodic pattern in a frame.

The motion estimation apparatus 30 is utilized for determining motion vectors for an image including periodic patterns. The global motion vector calculation unit 302 receives the periodic block information from the periodic block detection unit 314, receives motion vectors of periodic blocks in a region of the nth frame from the motion vector determination unit 312, and is utilized for determining a global motion vector (denoted as gmv in FIG. 3) corresponding to the region of the nth frame according to the motion vectors of the periodic blocks in the region of the nth frame. For example, the global motion vector calculation unit 302 calculates an average motion vector based on the motion vectors of the periodic blocks in the region of the nth frame and takes the average motion vector to be the global motion vector corresponding to the region. Relative to the (n+1)th frame, the nth frame is regarded as a previous frame. In an embodiment, the nth frame may be taken as a reference frame when performing motion estimation for the (n+1)th frame as a current frame. The reference frame is not limited to be the previous nth frame. In another embodiment, the reference frame may be a frame generated based on several previous frames.

It is noted that when generating the global motion vector corresponding to the region, the global motion vector calculation unit 302 does not consider those blocks which are also in the same region but are not periodic blocks, such that the global motion vector is associated with only periodic blocks.

The candidate motion vector generation unit 304 receives the periodic block information by the periodic block detection unit 314 and is utilized for generating a plurality of candidate motion vectors for each periodic block in every frame being considered.

The penalty calculation unit 306 receives the global motion vector corresponding to the region of the nth frame from the global motion vector calculation unit 302 and receives candidate motion vectors of a periodic block in the region of a current frame, e.g., the (n+1)th frame, from the candidate motion vector generation unit 304. Note that periodic blocks in the region of the current frame are called target periodic blocks hereinafter. The penalty calculation unit 306 is utilized for determining a respective penalty value for each candidate motion vector of the target periodic block, based on the difference between the candidate motion vector and at least one global motion vector corresponding to at least one relative region associated with the target periodic block. The at least one relative region associated with the target periodic block includes a region where the target periodic block is located, and includes (if have) at least one neighboring region of the target periodic block. The at least one neighboring region may be determined by which one of four sub-regions of the region where the target periodic block is located. More detailed description is given in the description of FIG. 5.

The similarity calculation unit 308 is utilized for calculating, for each candidate motion vector, a respective original similarity value with respect to the candidate motion vector. For example, the original similarity value may be calculated by summing up absolute differences between the target periodic block of the current frame (e.g., the $(n+1)^{th}$ frame) and a reference block of the reference frame (e.g., the previous $n^{th}$ frame) corresponding to the candidate motion vector. The above example uses a well-known Sum of Absolute Difference (SAD) computation method to obtain the original similarity value. In another embodiment, other computation method may be used instead to calculate the original similarity value with respect to the candidate motion vector.

The weighted similarity calculation unit 310 is utilized for calculating, for each candidate motion vector, a respective weighted similarity value based on the original similarity value and the penalty value. For example, the weighted similarity calculation unit 310 calculates the weighted similarity value by summing up the original similarity value and the penalty value.

The motion vector determination unit 312 is utilized for determining a respective motion vector of each periodic block according to weighted similarity value of the candidate motion vectors. The motion vector determination unit 312 outputs the motion vectors of the target periodic blocks of the current frame to the global motion vector calculation unit 302, such that the global motion vector calculation unit 302 determines global motion vectors corresponding to regions (those including periodic blocks) according to the motion vectors of the periodic blocks. These regional global motion vectors may be used in the penalty calculation unit 306 for calculating penalty values for periodic blocks of a future frame (e.g., $(n+2)^{th}$ frame).

Figure 4:
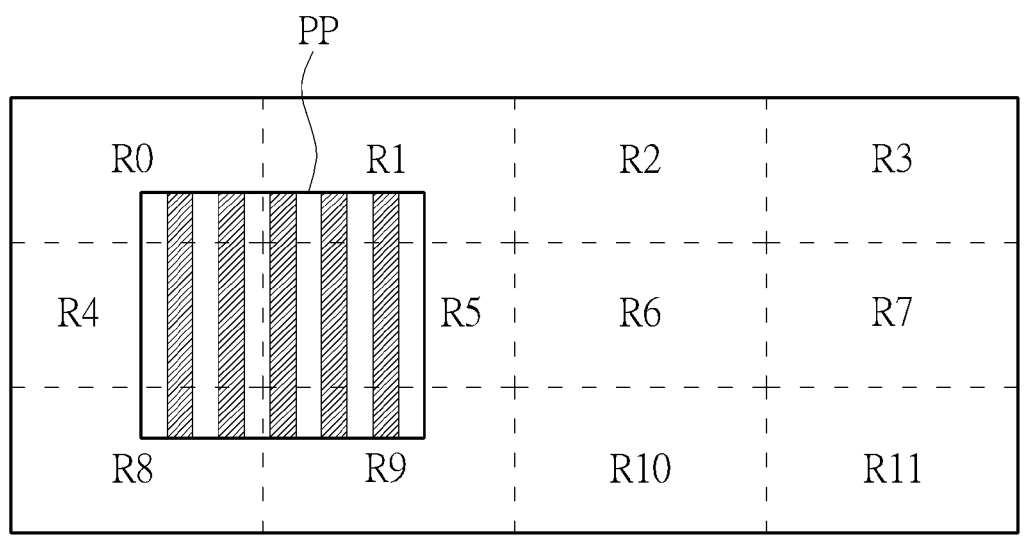
FIG. 4 and FIG. 5 are diagrams illustrating relationships between regions according to exemplary embodiments of the present invention.
Figure 5:
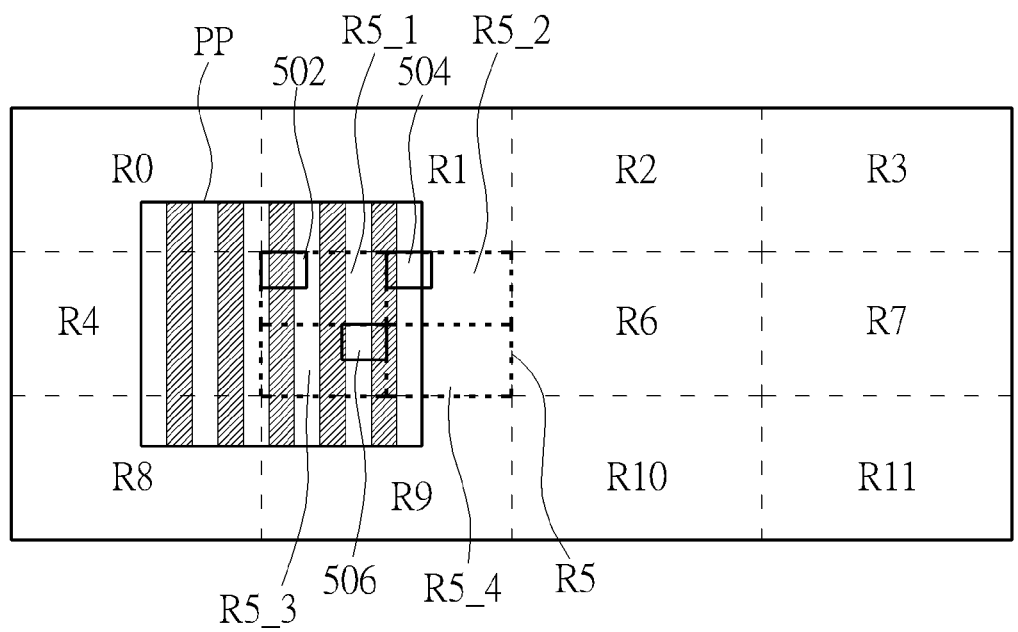

FIG. 4 and FIG. 5 are diagrams illustrating relationships between regions according to exemplary embodiments of the present invention. As shown in FIG. 4, a periodic pattern PP exists in an image frame divided into 12 regions, numbered from R0 to R11, and each of regions R0, R1, R4, R5, R8 and R9 includes at least one periodic block. Respective global motion vectors corresponding to the regions R0, R1, R4, R5, R8 and R9 of frames including the periodic pattern can be determined by the global motion vector calculation unit 302. For example, the global motion vector calculation unit 302 calculates an average motion vector based on the motion vectors of the periodic blocks in the region R4 of the $n^{th}$ frame and takes the average motion vector to be the global motion vector corresponding to the region R4 in the $n^{th}$ frame. The average motion vector may be an average of the motion vectors of the periodic blocks.

In the following, periodic blocks R502, R504, R506 shown in FIG. 5 are taken as examples to illustrate how the penalty calculation unit 306 works. The region where the target periodic block R502 is located is R5, the sub-region where the target periodic block R502 is located is R5_1, and the neighboring regions (including periodic blocks) neighboring to the sub-region R5_1 are R0, R1 and R4. That is, the relative regions associated with the target periodic block R502 are R0, R1, R4 and R5. For a candidate motion vector of the target periodic block R502 in the current $(n+1)^{th}$ frame, denoted as cmv0, the penalty calculation unit 306 determines a penalty value, denoted as PV_cmv0, based on at least one difference between the candidate motion vector cmv0 and global motion vectors $gmv_{R0}$, $gmv_{R1}$, $gmv_{R4}$ and $gmv_{R5}$ corresponding to relative regions R0, R1, R4 and R5 of a reference frame, e.g., $n^{th}$ frame. For example, the penalty value PV_cmv0 may be a function of a sum of absolute differences between the candidate motion vector cmv0 and respective global motion vectors $gmv_{R0}$, $gmv_{R1}$, $gmv_{R4}$ and $gmv_{R5}$, represented as equation (1) and equation (2):

$$x = |cmv0 - gmv_{R0}| + |cmv0 - gmv_{R1}| + |cmv0 - gmv_{R4}| + |cmv0 - gmv_{R5}| \quad (1);$$

$$PV\_cmv0 = f(x) \quad (2)$$

The region where the target periodic block R504 is located is R5, the sub-region where the target periodic block R504 is located is R5_2, and the neighboring region (including periodic blocks) neighboring to the sub-region R5_2 is R1 only. That is, the relative regions associated with the target periodic block R504 are R1 and R5. For a candidate motion vector of the target periodic block R504 in the current $(n+1)^{th}$ frame, denoted as cmv1, the penalty calculation unit 306 determines a penalty value, PV_cmv1, based on at least one difference between the candidate motion vector cmv1 and global motion vectors $gmv_{R1}$ and $gmv_{R5}$ corresponding to relative regions R1 and R5 of the reference frame, e.g., $n^{th}$ frame. For example, the penalty value PV_cmv1 may be a function of a sum of absolute differences between the candidate motion vector cmv1 and respective global motion vectors $gmv_{R1}$ and $gmv_{R5}$, represented as equation (3) and equation (4):

$$x = |cmv1 - gmv_{R1}| + |cmv1 - gmv_{R5}| \quad (3);$$

$$PV\_cmv1 = f(x) \quad (4)$$

The region where the target periodic block R506 is located is R5, the sub-region where the target periodic block R506 is located is R5_3, and the neighboring regions (including periodic blocks) neighboring to the sub-region R5_3 are R4, R8 and R9. That is, the relative regions associated with the target periodic block R504 are R4, R5, R8 and R9. For example, for each candidate motion vector of the target periodic block R506, the penalty calculation unit 306 determines a penalty value to be a function of a sum of absolute differences between the candidate motion vector and respective global motion vectors $gmv_{R4}$, $gmv_{R5}$, $gmv_{R8}$ and $gmv_{R9}$.

In an embodiment, when a periodic pattern is fully distributed within only one region such as the region R5 of FIG. 4 and is not related to other region, the region (e.g., R5) may be determined as the only relative region associated with the target periodic block. For each candidate motion vector of the target periodic block, the penalty calculation unit 306 determines a penalty value based on the difference between the candidate motion vector and the global motion vector corresponding to the only relative region.

Figure 6:
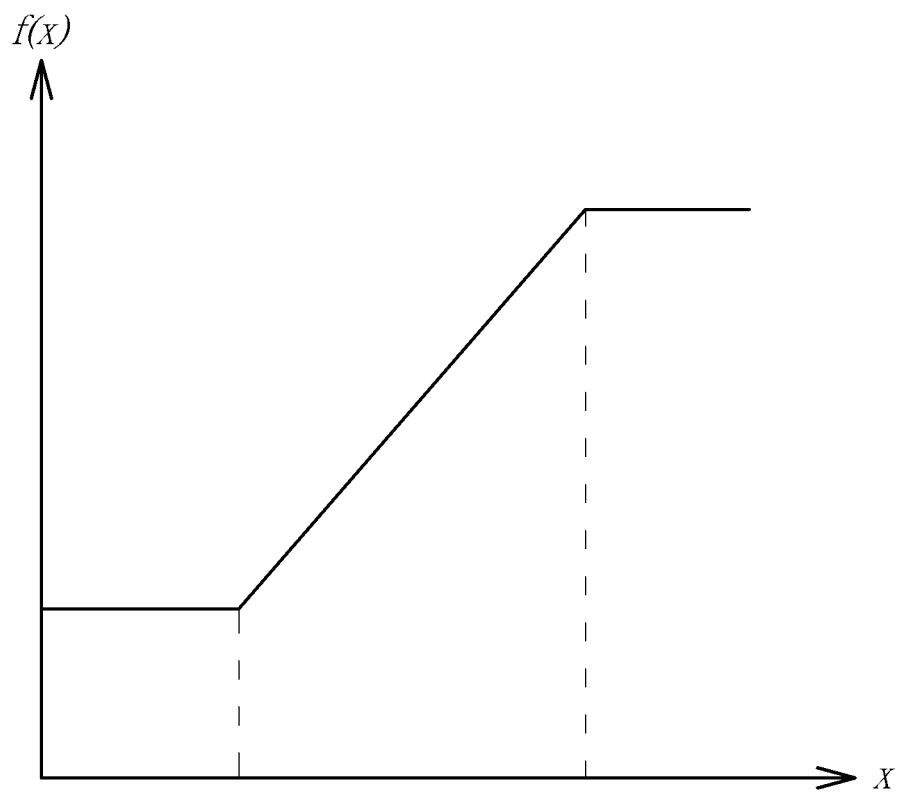
FIG. 6 is a diagram illustrating a penalty value according to an exemplary embodiment of the present invention.

FIG. 6 is a diagram illustrating a penalty value according to an exemplary embodiment of the present invention. In FIG. 6, x is the sum of absolute differences between the candidate motion vector and respective global motion vectors corresponding to at least one relative region associated with the target periodic block, and f(x) is the penalty value. In this example, when the value of x is in a specific region, the penalty value f(x) is directly proportional to x.

Therefore, when the candidate motion vector and the global motion vector corresponding to the relative region of the target periodic block are substantially equivalent, a lower penalty value is applied. When the candidate motion vector and the global motion vector corresponding to the relative region of the target periodic block are significantly different, a higher penalty value is applied.

After the corresponding penalty value and the original similarity value (e.g., SAD) of the candidate motion vector of the target periodic block are calculated, the weighted similarity calculation unit 310 calculates the weighted similarity value by summing up the original similarity value and the penalty value for each candidate motion vector of the target periodic block. The motion vector determination unit 312 determines a motion vector of the target periodic block according to the weighted similarity values of the corresponding candidate motion vectors. In an embodiment, the motion vector determination unit 312 selects a candidate motion vector having the smallest weighted similarity value to be as the motion vector of the target periodic block.

In a brief, the motion estimation apparatus according to the embodiment determines the motion vector of the target periodic block by considering the difference between each of candidate motion vectors of the target periodic block and regional global motion vectors associated with the target periodic block. As a result, the motion estimation apparatus can accurately determine motion vectors for periodic blocks and reduce the probability of obtaining incorrect motion vectors. Image quality of a video including periodic pattern is improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A motion estimation method for blocks of a periodic pattern, comprising:
    determining a global motion vector corresponding to a region in a first frame according to motion vectors of periodic blocks in the region in the first frame, wherein the region is one of a plurality of regions divided from the first frame and the periodic blocks in the region are a part of the periodic pattern;

generating a plurality of candidate motion vectors of a target periodic block to be encoded in a second frame;

for each candidate motion vector, determining a penalty value based on at least one difference between the candidate motion vector and at least one global motion vector corresponding to at least a relative region in the first frame, wherein the at least one relative region is associated with the target periodic block;

for each candidate motion vector, calculating a weighted similarity value based on an original similarity value between the target periodic block of the second frame and a reference block corresponding to the candidate motion vector of the first frame, and the penalty value; and determining a motion vector of the target periodic block according to weighted similarity values of the candidate motion vectors.

2. The motion estimation method of claim 1, further comprising:

for each block in the second frame, detecting whether the block is a periodic block.

3. The motion estimation method of claim 1, wherein the original similarity value is calculated by summing up absolute differences between the target periodic block of the second frame and the reference block corresponding to the candidate motion vector of the first frame.

4. The motion estimation method of claim 1, wherein the penalty value for each candidate motion vector is directly proportional to the sum of absolute differences between the candidate motion vector and the at least one global motion vector of the at least one relative region associated with the target periodic block.

5. The motion estimation method of claim 4, wherein the at least one relative region associated with the target periodic block comprises a region where the target periodic block is located.

6. The motion estimation method of claim 5, wherein the at least one relative region associated with the target periodic block further comprises at least one neighboring region near the target periodic block, which is determined by which one of four sub-regions of the region where the target periodic block is located.

7. The motion estimation method of claim 1, wherein the weighted similarity value is the sum of the original similarity value and the penalty value.

8. The motion estimation method of claim 1, wherein the step of determining the motion vector of the target periodic block in the second frame according to weighted similarity values of the candidate motion vectors comprises:

selecting a candidate motion vector having the smallest weighted similarity value from the plurality of candidate motion vectors to be the motion vector of the target periodic block.

9. The motion estimation method of claim 1, wherein determining the global motion vector corresponding to the region in the first frame according to the motion vectors of the periodic blocks in the region in the first frame comprises:

calculating an average motion vector based on the motion vectors of the periodic blocks in the region and taking the average motion vector to be the global motion vector.

10. A motion estimation apparatus for blocks of a periodic pattern, comprising:

a global motion vector calculation unit, for determining a global motion vector corresponding to a region in a first frame according to motion vectors of periodic blocks in the region in the first frame, wherein the region is one of a plurality of regions divided from the first frame and the periodic blocks in the region are a part of the periodic pattern;

a candidate motion vector generation unit, for generating a plurality of candidate motion vectors of a target periodic block to be encoded in a second frame;

a penalty calculation unit, for determining a penalty value for each candidate motion vector based on at least one difference between the candidate motion vector and at least one global motion vector corresponding to at least one relative region in the first frame, wherein the at least one relative region is associated with the target periodic block;

a weighted similarity calculation unit, for calculating a weighted similarity value for each candidate motion vector based on an original similarity value between the target periodic block of the second frame and a reference block corresponding to the candidate motion vector of the first frame, and the penalty value; and a motion vector determination unit, for determining a motion vector of the target periodic block according to weighted similarity values of the candidate motion vectors.

11. The motion estimation apparatus of claim 10, wherein the periodic blocks are detected by a periodic block detection unit.

12. The motion estimation apparatus of claim 10, further comprising:

a similarity calculation unit for calculating the original similarity value by summing up absolute differences between the target periodic block of the second frame and the reference block corresponding to the candidate motion vector of the first frame.

13. The motion estimation apparatus of claim 10, wherein the penalty value for each candidate motion vector is directly proportional to the sum of absolute differences between the candidate motion vector and the at least one global motion vector of the at least one relative region associated with the target periodic block.

14. The motion estimation apparatus of claim 13, wherein the at least one relative region associated with the target periodic block comprises a region where the target periodic block is located.

15. The motion estimation apparatus of claim 14, wherein the at least one relative region associated with the target periodic block further comprises at least one neighboring region near the target periodic block, which is determined by which one of four sub-regions of the region where the target periodic block is located.

16. The motion estimation apparatus of claim 10, wherein the weighted similarity calculation unit calculates the weighted similarity value by summing up the original similarity value and the penalty value.

17. The motion estimation apparatus of claim 10, wherein the motion vector determination unit selects a candidate motion vector having the smallest weighted similarity value from the plurality of candidate motion vectors to be the motion vector of the target periodic block.

18. The motion estimation apparatus of claim 10, wherein the global motion vector calculation unit calculates an average motion vector based on the motion vectors of the periodic blocks in the region and takes the average motion vector to be the global motion vector corresponding to the region in the first frame.

* * * * *